United States Patent [19]

Blair

[11] 4,073,532
[45] Feb. 14, 1978

[54] ROUND BALE HANDLER

[76] Inventor: Calvin B. Blair, P.O. Box 97, Barnard, Kans. 67418

[21] Appl. No.: 694,198

[22] Filed: June 9, 1976

[51] Int. Cl.² .............................................. B66C 3/16
[52] U.S. Cl. ............................... 294/107; 214/147 G; 294/88
[58] Field of Search ................... 294/61, 88, 105–109, 294/120; 214/147 R, 147 G, 652, 653, DIG. 4, 145 A, 701 P

[56] References Cited

U.S. PATENT DOCUMENTS

| 2,049,679 | 8/1936 | Whiteman et al. | 294/107 |
| 2,551,235 | 5/1951 | Bates | 294/109 |
| 2,605,919 | 8/1952 | Shattuck | 214/147 G |
| 2,832,634 | 4/1958 | Bergerson | 294/107 X |
| 3,048,288 | 8/1962 | Dwyer | 214/147 G |
| 3,112,830 | 12/1963 | Podlesak | 214/147 G X |
| 3,319,813 | 5/1967 | Beyea | 294/107 X |
| 3,427,640 | 2/1969 | Clatterbuck | 214/147 G X |
| 3,845,871 | 11/1974 | DiLillo et al. | 214/145 A |
| 3,854,609 | 12/1974 | Cox | 294/107 X |

Primary Examiner—Johnny D. Cherry
Attorney, Agent, or Firm—Fishburn, Gold & Litman

[57] ABSTRACT

A round bale handling device for use with conventional farm tractor front end loaders includes a normally vertical, forwardly tiltable frame having a pair of shafts with a plurality of tines thereon mounted for partial rotation about longitudinal axes thereof, permitting grasping of a bale positioned therebetween for handling without substantial compression of the bale surface. Motive structure is provided to rotate the shafts to engage and disengage bales, and quick detach hitch members secure the bale handling device to the loader for manipulation by the tractor operator.

1 Claim, 5 Drawing Figures

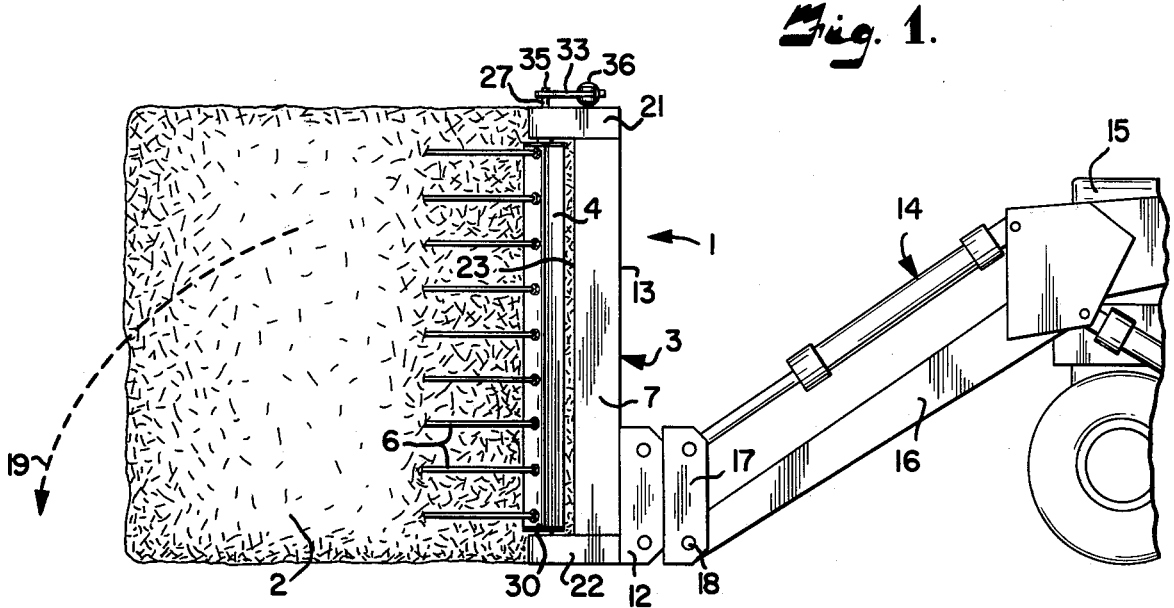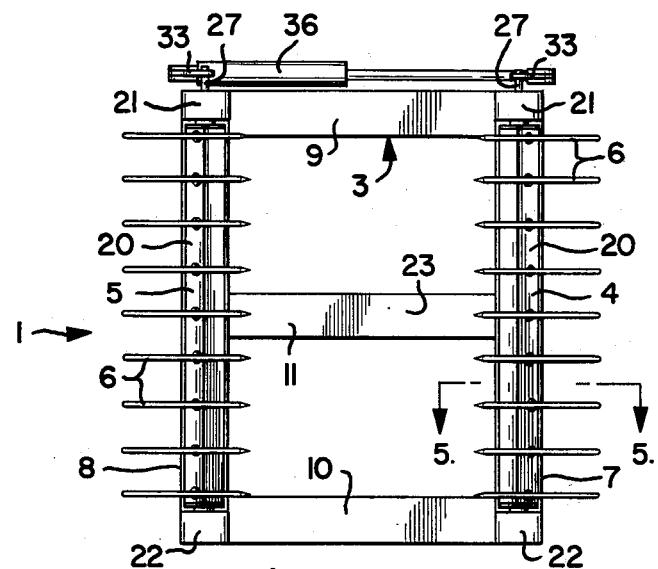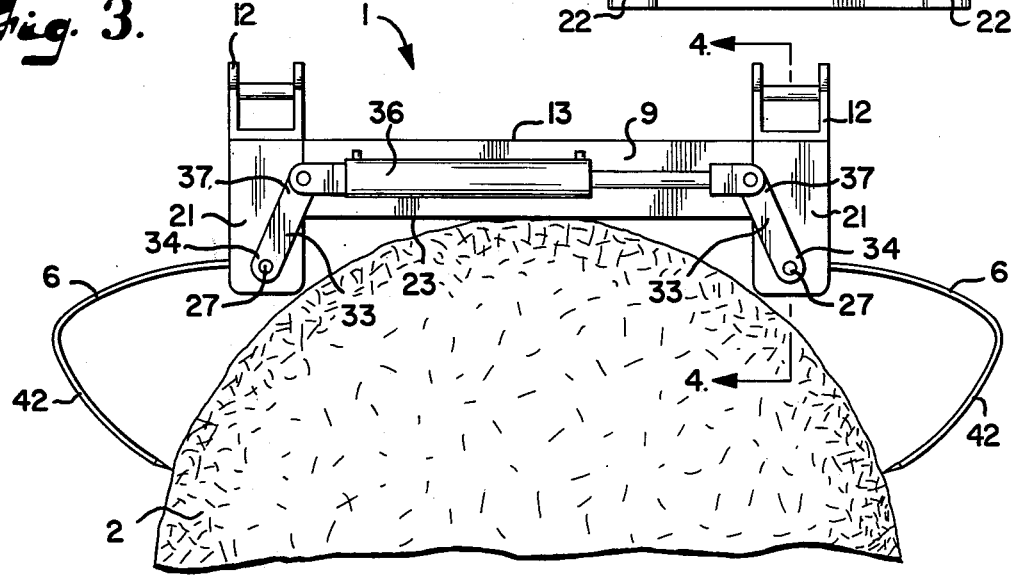

ROUND BALE HANDLER

The present invention relates to material handling and loading apparatus, and is particularly adapted for handling large, round hay bales.

The use of large, round hay bales in modern livestock operations is becoming increasingly prevalent due to the efficiency assocated with the high bulk units. These round bales are generally cylindrical with a diameter and length of approximately 5 feet and a weight of about 1500 pounds. The size and weight of these bales renders manual handling impractical thus dictating the use of machinery for forming, lifting and moving such bales.

Existing apparatus for handling round bales include various forks, clamps, scoops, and spindling devices, however, they tend to be inefficient and/or expensive in construction. Industrial type fork lifts have been suggested, but these tend to be unsatisfactory since the lateral distance between the fork teeth are usually preset to a certain width less than the diameter of the bale. In driving the forks beneath the bale there is a tendency to snag the baling wire or rope, and during transportation the bale is relatively unstable and likely to fall. Other handling machines suggested employ clamping or cradling arms; however, such arms tend to exert concentrated stresses against the bale at the points of contact, either through a squeezing action or by gravity, thereby undesireably deforming and compressing the bales. Still other devices employ spikes or tines which are driven into the bale, but these present difficulties in separating the bale from the grasping structures and in manipulation without complex control devices. The present invention avoids the above difficulties by providing a round bale handling mechanism which is simple yet highly effective.

The principal objects of the present invention are: to provide an improved device for lifting and carrying round bales; to provide such a device adapted to conveniently and quickly grasp and hold a round bale for manipulation and transport; to provide such a device that is adapted for easy attachment to a farm tractor front end loader; to provide such a device having generally parallel shafts, each supporting a plurality of spaced-apart, curved tines attached thereto and rotatable therewith to grasp a bale for manipulation and transport; to provide such a device which may be easily disengaged from a bale; to provide such a device which does not depend upon clamping forces to support a bale; to provide such a device which minimizes the application of concentrated stress on surface areas of a bale; to provide a device which engages a bale with minimum likelihood of damage thereto; to provide such a device which may be easily tilted for use in various positions and whereby a round bale resting either on one of its bases or its cylindrical surface may be seized for handling and loading; and to provide a round bale loader which is economical to manufacture, highly efficient and durable in use, and particularly well adapted for its intended purpose.

Other objects and advantages of this invention will become apparent from the following description taken in connection with the accompanying drawings, wherein are set forth by way of illustration and example certain embodiments of this invention.

The drawings constitute a part of this specification and include an exemplary embodiment of the present invention and illustrate various objects and features thereof.

FIG. 1 is a side elevational view of a bale handler embodying this invention attached to the front end loader mechanism of a farm tractor, and shown in the vertical position.

FIG. 2 is a front elevational view of the bale handler of FIG. 1.

FIG. 3 is an enlarged plan view of the bale handler shown just prior to engagement with a bale.

Figure 4:
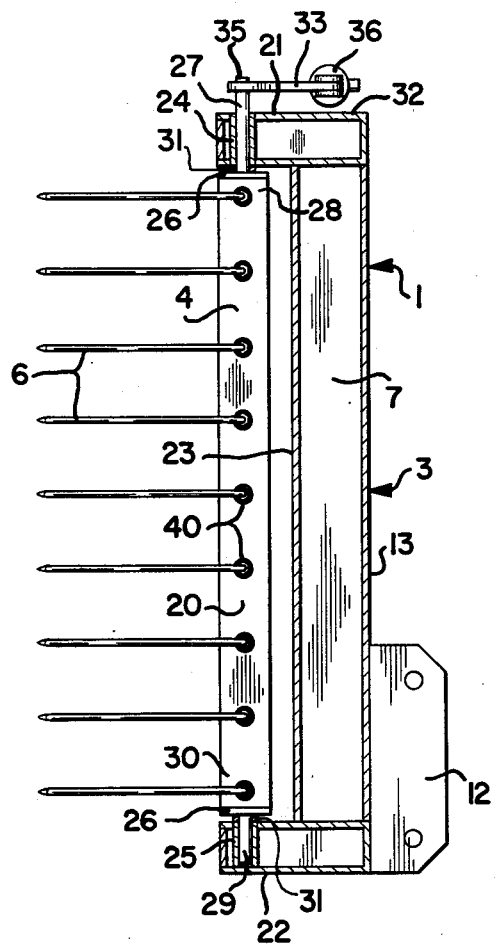
FIG. 4 is a fragmentary longitudinal cross-sectional view of the round bale handler, taken on the line 4—4, FIG. 3.

Referring to the drawings in more detail:

The reference numeral 1 generally designates a round bale handler for lifting a round hay bale 2, or the like, to transfer same between desired locations. The round bale 2 is of the type which is generally cylindrical, having a diameter of about 5 feet, a length of a similar dimension and weighing roughly 1500 pounds. The handler 1 comprises a normally vertical, forwardly tiltable support frame 3 having a pair of tine shafts 4 and 5 rotatably mounted thereon. A plurality of arcuate tines 6 are spaced along each shaft, 4 and 5, for engagement with a bale 2.

The support frame 3 has a pair of side beams 7 and 8 joined to the transversely extending top beam 9 and bottom beam 10 to form a rectangular arrangement. A stabilizer beam 11 has its ends joined to the side beams 7 and 8 near the midpoints thereof to give the support frame 3 the desired structural rigidity, and further functions as a stop to prevent the bale 2 from tilting backward during bale engagement. The support frame 3 has a pair of hitch members 12 on a rear side 13 thereof for attachment to the front loader mechanism 14 of a farm tractor 15 or like service vehicle. The support frame 3 may be constructed from any suitable structural stock, and in the illustrated arrangement, the members are rectangular cross section, tubular beams suitably joined, as by welding.

The frong loader mechanism 14 is an hydraulically actuated device of the type commonly employed on various tractors and similar service vehicles. Forwardly projecting lift arms 16 have hitch receiving members 17 pivotally mounted on a free end thereof and are adapted to removably secure thereto the hitch members 12. The hitch receiving members 17 may be tilted about a lower pivot 18 to partially rotate the round bale handler 1 from a vertical position as shown in FIG. 1, to a forwardly extending, substantially horizontal position as indicated by the direction of the broken line and arrow 19.

Figure 5:
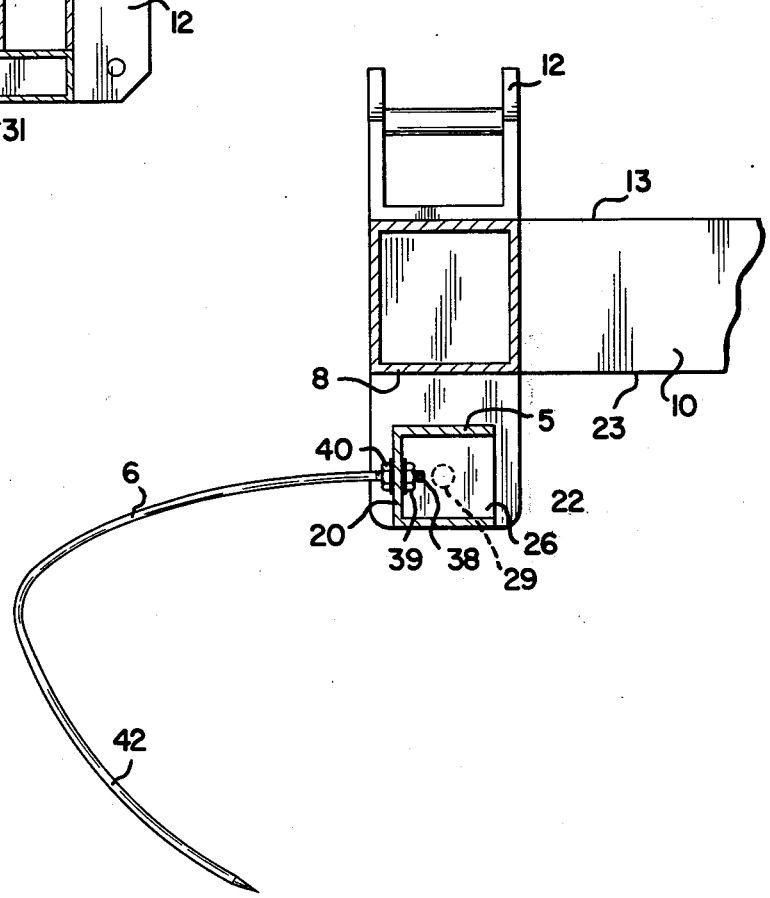
FIG. 5 is a fragmentary transverse cross-sectional view through one side of the round bale handler, taken on line 5—5, FIG. 2 on a further enlarged scale.

The tine shafts 4 and 5 are mounted substantially parallel to the side beams 7 and 8 and in this example, are approximately 5 feet long in order to engage a substantial portion of the bale cylindrical surface. The shafts 4 and 5 are parallel to each other with the distance therebetween being less than the diameter of the bale 2, an appropriate distance being roughly 3 feet. Adequate offset is provided between the shafts 4 and 5 and their respective side beams 7 and 8 to allow clearance therebetween during rotation of the shafts 4 and 5. As best seen in FIGS. 4 and 5, the shafts 4 and 5 are shown as channels, each having the open side thereof generally facing inwardly toward the opposing shaft, while the web 20 thereof has a plurality of spaced apart apertures along a substantial length thereof to receive the bale engaging tines 6 therethrough.

The side beams 7 and 8 each have a top and bottom forward extension, 21 and 22 respectively, located at the opposite ends thereof and projecting perpendicularly from the bale engaging side 23 of the frame 3. Each top extension 21 has a top bearing sleeve 24, and each bottom extension 22 has a bottom bearing sleeve 25. The top and bottom bearing sleeves 24 and 25 on each side beam are mutually aligned.

As illustrated in FIG. 4, the tine shafts 4 and 5 have end plates 26 joined, as by welding, to each end thereof. A top journal shaft 27 is joined, as by welding, to the end plates 26 on the top ends 28 of the tine shafts 4 and 5; and a bottom journal shaft 29 is joined, as by welding, to the bottom ends 30 thereof. The top and bottom journal shafts 27 and 29 are colinear with the longitudinal axis of the respective tine shaft 4 or 5.

The tine shafts 4 and 5 are mounted on the forward extensions 21 and 22 with the top and bottom journal shafts 27 and 29 received respectively in the top and bottom bearing sleeves 24 and 25. A suitable thrust washer or bearing 31 is positioned around each journal shaft 27 and 29 between the respective end plates 26 and bearing sleeve 24 or 25. The thrust washers 31 function to prevent damage to the end plates 26 and the bearing sleeves 24 and 25 resulting from longitudinal loads imposed on the tine shafts 4 and 5 during bale manipulation and transportation.

The upper journal shafts 27 extend past the upper surface 32 of the top extensions 21. A pair of lever arms 33 have one end 34 rigidly attached to the free ends 35 of the upper journal shafts 27. An hydraulic cylinder 36 has the opposite ends thereof pivotally connected to the other ends 37 of the lever arms 33. Actuation of the cylinder 36 acting through the lever arms 33 effects rotation of the tine shafts 4 and 5 for engagement with and disengagement from a bale.

It is to be understood that although an hydraulic cylinder and lever arms have been described and illustrated for rotating the tine shafts 4 and 5, any suitable motor could be employed, such as a suitably geared electric motor, hydraulic motor, or the like. Although the cylinder 36 and lever arms 33 have been illustrated as located at the top ends 28 of the shafts 4 and 5, it will occur to those skilled in the art that they could be located elsewhere.

As illustrated in FIG. 5, the mounting ends 38 of tines 6 are threaded to receive an inner nut/washer 39 and an outer nut/washer 40, which are tightened against the respective web 20 of the shafts 4 and 5 to removably mount each of the tines 6 thereon. Although various cross-section structural shapes could be used as mounting shafts for the tines 6, as for example a circular shaft or the like, the channel shape is employed in the illustrated embodiment, since the open inner side allows access to the tine mounting means, thereby facilitating simple, quick replacement of broken tines in the field. The tines 6 of the respective tine shafts 4 and 5 project therefrom in planes perpendicular thereto, curving inwardly toward the opposing tine shaft, and taper to a sharp point on the free ends 41 thereof.

Preferably, the tines 6 have a circular portion 42 with the center thereof coinciding with the respective longitudinal axis of the tine shaft to which it is attached to minimize damage to the bale 2 during engagement therewith.

In using the bale handler 1 to pick up a bale 2 supported by one of its base ends on a flat surface, such as the ground, the tractor 15 is caused to approach the bale 2 while maintaining the shafts 4 and 5 approximately equidistant from the longitudinal axis of the bale 2. The tractor 15 is driven toward the bale 2 with the bale handler 1 in a substantially vertical position, the tines 6 being in the open or disengaged position, until the stabilizer beam 11 of the support frame 3 contacts the bale 2, or comes into close proximity thereto. The tractor operator then remotely actuates the hydraulic cylinder 36 via hydraulic control lines (not shown), to rotate the tine shafts 4 and 5 thereby closing the tines 6 in a jaw like manner, with the tines 6 rotating inwardly toward each other to penetrate the cylindrical surface of the bale 2. The front loader mechanism 14 may then be raised to lift the bale 2 from the ground, or other supporting surface, for handling or transport. The hitch receiving members 17 may also be tilted to maintain the bale 2 in the vertical position during the lifting thereof, or, preferably, may be tilted back so that the majority of the weight of the bale 2 is supported by the frame 3, for example, during transport over a relatively long distance upon bumpy terrain.

Similarly, a bale 2, whose cylindrical surface is supported by the ground or other surface, may be approached as described above by the tractor 15 with the handler 1 tilted to the forwardly disposed horizontal position. The bale handler 1 is manipulated to a position directly over the bale 2 then is lowered until the stabilizer beam 11 contacts the bale 2, whereupon the opened tines 6 are rotated into grasping engagement with the bale 2 to seize the same for subsequent manipulation and transport. The above sequences may be reversed for bale disposition.

Although reference has been made to round bales throughout this application, it is to be understood that the invention may be utilized effectively in connection with bales which are not round as well as bales which are of other materials than hay.

It is to be further understood that although certain forms of this invention have been illustrated and described, it is not to be limited thereto except insofar as such limitations are included in the following claims.

What is claimed and desired to secure by Letters Patent is:

1. A device for handling large round bales of hay comprising:
 (a) a frame having:
  (1) a top beam,
  (2) a bottom beam,
  (3) first and second laterally spaced side beams being joined together in a rectangular arrangement with said top and bottom beams,
  (4) projections extending from opposite ends of said first and second side beams, each of said projections having a bearing member, said bearing member being aligned along said side beam to which said bearing member is connected respectively,
  (5) a bale engaging side;
 (b) hitch means connected to said bottom beam of said frame for connection with hitch receiving members of a manipulating loader for rotating said frame between a horizontal position and a vertical position;
 (c) first and second laterally spaced shafts having coaxial journals fastened at opposite ends of said shafts and a lever arm attached to each said shaft; said shafts being rotatably mounted on said bale engaging side of said frame by positioning said journals in said respective aligned bearing members;

(d) a plurality of curved bale engaging tines secured to and spaced along said respective shafts in generally opposed relation for mutually penetrating spaced apart lines on the surface of said bale to a substantial depth; each said tine having a generally circular bale engaging portion of substantial arcuate length; each of said circular portion of said tines having an imaginary center generally coinciding with the longitudinal rotational axis of said respective shaft, whereby said circular portion penetrates into said bale without substantial deformation of the passageway formed in said bale by said circular portion; and (e) motor means connected to said lever arms, thereby selectively rotating said shafts to effect engagement and disengagement between said tines and said bale when said frame is in either said vertical or horizontal position.

* * * * *